United States Patent [19]

Bresell

[11] 4,257,698
[45] Mar. 24, 1981

[54] CASSETTE FILM TYPE INDICATOR FOR A STILL CAMERA

[76] Inventor: Raymond J. Bresell, 18 Moody Ave., Claremont, N.H. 03743

[21] Appl. No.: 110,316

[22] Filed: Jan. 8, 1980

[51] Int. Cl.³ .............................................. G03B 17/00
[52] U.S. Cl. .................................... 354/289; 116/213
[58] Field of Search ................ 354/289, 295; 116/213, 116/297, 319, 335

[56] References Cited

U.S. PATENT DOCUMENTS

| | | | |
|---|---|---|---|
| 2,177,978 | 10/1939 | Darvie | 116/319 X |
| 2,466,171 | 4/1949 | Hencke et al. | 354/295 |
| 2,714,844 | 8/1955 | Heidecke | 354/289 X |
| 3,029,771 | 4/1962 | Todhunter et al. | 116/335 X |
| 3,066,642 | 12/1962 | Steinmetz et al. | 354/289 X |

*Primary Examiner*—Donald A. Griffin
*Attorney, Agent, or Firm*—Sughrue, Rothwell, Mion, Zinn and Macpeak

[57] ABSTRACT

A cylindrical plastic minder body bears a threaded stud axially on one end face for threaded coupling to the bottom of a camera body. Opposed sides of the cylindrical minder body are flattened and bear on the flat faces, pivotal markers, whose arms sweep across the beveled faces and are locked at angularly displaced positions adjacent circumferentially spaced marks which indicate on one side of the marker of the minder body, the number of film frames borne by the camera carried film cartridge and on the opposite face the type of film borne by the covered film cassette.

5 Claims, 7 Drawing Figures

CASSETTE FILM TYPE INDICATOR FOR A STILL CAMERA

FIELD OF THE INVENTION

This invention pertains to still cameras such as SLR and TLR type cameras which offer a variety of film frames and types of film and more particularly to a detachable cassette film type and frame minder for such cameras.

Once the camera is loaded, the photographer must guess the number of film frames in the cassette and also the type of film being used. Many times photographers; using more than one camera, or a single camera used infrequently fail to remember the exact film type they are using or the number of frames on the roll that is in the camera. With the advent of the multi-film frame cassette for a 35 mm SLR type camera there is now a choice of three different cassette sizes that are used extensively these being the 20, 24 and 36 frame cassettes. A similar problem involves the type of film that is being shot. The film may be black and white, color negative or color reversal and this further complicates the situation.

Conventionally in order to be sure of the number of frames on the role and the specific type of film being used, the photographer usually rewinds the film and opens the camera to check the cassette information which in addition is readily displayed on the cassette but is hidden when the cassette is placed internally of the camera body. The photographer then replaces the film cassette and clicks off the roll film to the original stop frame. Many times the film is reinserted at a slightly different point from the point of primary insertion, causing a double exposure of the last frame shot and consequently ruining two frames. There is also the ever present possibility of clouding the entire film if the rewind and film cassette inspection is done in a haphazard manner.

It is therefore a primary object of the present invention to provide a film type and frame minder device to assist the photographer in areas which are normally of no concern to the camera manufacturer.

It is a further object of the present invention to provide an improved, simplified cassette film type and frame minder device constituting a detachable assembly which may be readily mounted to a still camera, which is unobtrusive, and which does not interfere with the normal capability of the camera to further mount a tripod, hand grip or the like.

SUMMARY OF THE INVENTION

The present invention constitutes a cassette film type and frame minder for a still camera, said minder comprising: a minder body, means born by said body for attachment of said minder body to said still camera, said body bearing laterally opposed faces, marker arms pivotly mounted on each of said laterally opposed faces for arm arc sweeping across a given face on said minder body and sets of marks carried by each face at circumferentially spaced positions adjacent the arc sweep of said marker arm. One of said sets of marks comprising indeucs indicating the number of film frames born by the camera film cartridge and the other set of marks comprising indeucs indicating given specific types of film for said cassette.

Preferably the minder body comprises a cylindrical body having opposed flatten sides and said marker arm comprises an L-shaped member including an intrigal shaft. Said minder body comprises a transversal hole extending through said body from one flattened side face to the other. Said shafts of said marker arms project into the hole from opposite faces into said body and each supports said arm for rotation about the axis of said shaft. Preferably, each arm bears a spherical detent projection on said arm facing said flattened minder body face and said minder body face bears spherical recesses at circumferentially spaced positions relative to the sweep of said arm and in the path of said arm detent such that said detent locks within said spherical recess at a given angular position adjacent a given mark, during manual rotation of said arm about said shaft axis. Said cylindrical body preferably bears an insert including a threaded plug on one end face, for threaded coupling to a threaded hole within the bottom of said camera. Said cylinder bears on its opposite end face a threaded hole within said insert corresponding to that born by said camera to permit threaded coupling via said cylindrical minder body to a tripod or the like. Preferably a transverse hole may extend through said minder body from one flatened face to the other, each of said marker arm shaft is bifurcated and terminates on bifurcated end in radially projecting lips. said lips project into an axial hole within said cylindrical minder body such that, said marker arms may be readily snap fit to the minder body on respective opposed flatened faces thereof while permitting said marker arms to be rotated between angularly shiftable positions in for detent locking at a selected angular position adjacent a mark corresponding to the physical and chemical characteristics of the film within the cassette retained by the camera.

DESCRIPTION OF THE PREFERRED EMBODIMENT

Figure 1:
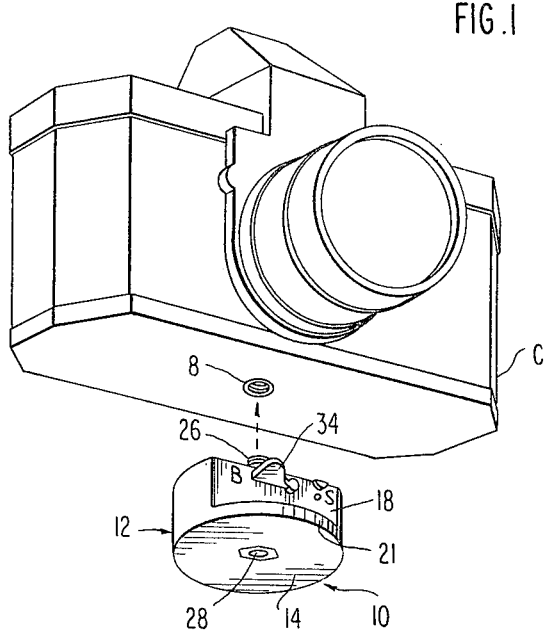
FIG. 1 is is an exploded, perspective view of a camera and the cassette film type and frame minder of the present invention.
Figure 2:
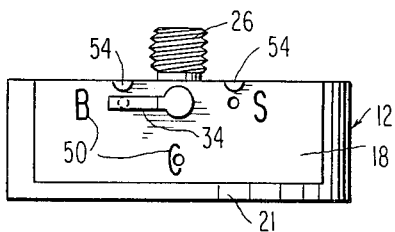
FIG. 2 is a front elevational view of cassette film type and frame minder forming one embodiment of the present invention.
Figure 3:
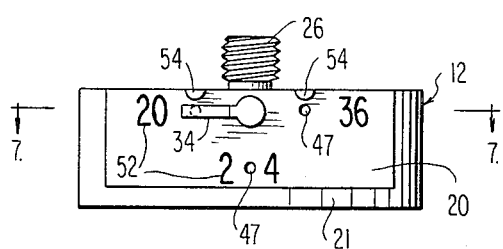
FIG. 3 is a rear elevational view of the film of the cassette film type and frame minder as shown in FIG. 1.
Figure 4:
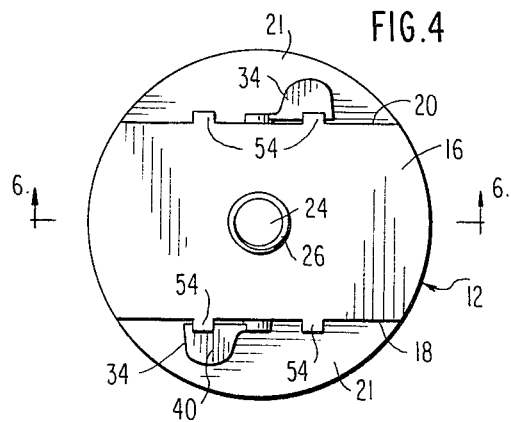
FIG. 4 is a top plan view thereof.

Referring to the drawings, the cassette film type and frame minder indicated generally at 10 is detachably mounted to a conventional still camera C utilizing the existing internally threaded hole 8 on the bottom of the camera body that is usually used for attaching a mount to the camera such as a tripod. In FIG. 1, the camera C which may comprise a 35 mm SLR type camera. The cassette film type and frame minder 10 is formed principally by a rather short length cylindrical minder body 12 which includes a bottom 14, a top 16 The cylindrical minder body 12 is flattened or recessed to form opposed flat faces including a front face 18 and a rear face 20. The faces extend downwardly from top 16 towards bottom 14 but stop short thereof to define arcuate lips 21 which underlie the camera C when attachment is effected so as to prevent inadvertantly, the pivotal or displacable markers mounted to respective faces 18 and 20 from being inadvertantly shifted in angular position and to change what is an otherwise accurate indication of the film type and frame content of the cartridge (not shown) mounted within the camera C.

Figure 5:
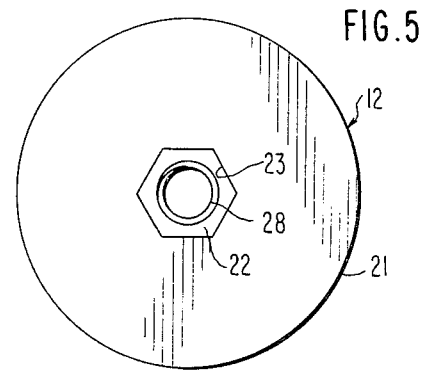
FIG. 5 is a bottom plan view thereof.
Figure 6:
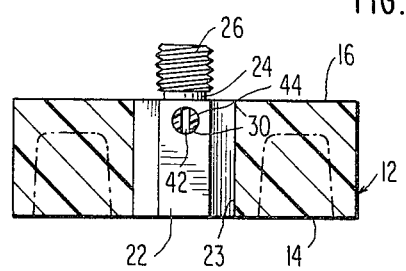
FIG. 6 is a vertical sectional view thereof taken about line 6—6 of FIG. 4.
Figure 7:
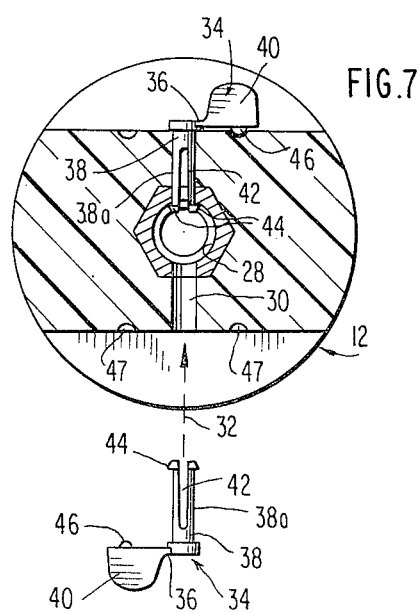
FIG. 7 is a horizontal sectional view, partially exploded of the cassette film type and frame minder taken about line 7—7 of FIG. 3.

The body 12 may be formed of metal or high impact plastic and may be cast or machined as desired. Preferably aluminum or plastic may be employed for lightening and in the illustrated embodiment, there is provided a hexagonal hole as in 23 within the axial center of the body which receives a hexagonal shape insert or plug 22 which may be force fit and which, bears an a axial projection at 24 which is threaded at 26 and which permits the minder body 12 to be detachably detached to the body of the camera C utilizing the existing threaded hole O within that camera body, FIG. 1. In addition, the plug or insert 22 bears a threaded hole 28 on its opposite end, FIG. 5 which receives the threaded portion of an attachment such as a tripod hand grip or other type camera mount (not shown) thus, the physical attachment of the minder 10 to the camera in no way interfers with normal camera operation or its capability to mount attachments to the camera which would normally be attached to the camera through the mounting hole 27. The hole 28 may extend upwardly through insert 22 for a major portion of its length for instance to a position near the top 16 of the body 12. The minder 12 body, preferably is provided with a transversely extending drilled hole as at 30 which extends through the insert 22 and opens to the threaded hole 38 of the insert. The hole 30 which extends completely through both the body 12 and insert 22, bears at point end pivotal markers indicated generally at 34. These are pivotally mounted respectively to the opposite vertical faces 10, 20. As may be best seen in FIG. 7, each of the markers 34 comprise a marker arm 36 which is flatened or expanded to form integral wing 40 remote from the axis of an integral shaft 38 which extends from to the arm, at right angles thereto. The shaft 38 is bifurcated by means of a slot 42 to form opposed resilient shaft portions 38a which terminate at the end of the shaft remote from the intrical arm 36 in intrigal locking flanges or lips at 44, the locking flanges constitute radical projections for bifurcated shaft portions 38a. The makers 34 are mounted for rotation about the axis of the intrigal shafts 38 by snap fitting the shafts to the minder body 12. Inserting the shafts 38 as indicated by arrow 32 into the hole 30 with the shafts being of a prescribed length, causes the locking flanges 44 to snap move away from each other subsequent to being previously compressed together to permit entry within the transverse hole 30 and thus locking the markers to the minder body on opposite faces 18 and 20 of the minder body 12. Additionally, each of the markers includes an integral spherical detent or projection 46 on the edge of the wing 40 facing the surfaces 18 and 20. Further, these surfaces are provided with spherical recesses as at 47 which receives the spherical detent so as to lock the arms in a given angular position. As may be appreciated, each face 18 and 20 of the minder body carries certain indicia or marks; face 18 carrying indicia or marks as at 50 which as illustrated, constitute, counter clockwise letters B, C and S of the alphabet. The B stands for black and white film, C stands for color reversal film and S stands for color negative film. The indicia or marks 50 therefore identify the chemical characteristics of the film within the cassette employed by the camera c. On the opposite face 20, marks or indicia are provided at 52 at circumferentially spaced positions with respect to the sweep of the arm 36 of its marker 34. The indicia or marks 52 comprise the numerals 20, 24 and 36 in a counterclockwise direction. These marks indicate the number of film frames for the cassette employed by the camera that is either a 20 frame film cassette, a 24 film frame cassette or a 36 film frame cassette.

Further, the minder body 12 is provided intrigally with projections as at 54 which project outwardly from the flattened side facing 18 and 20 of the minder body and prevent each marker arm 36 in its intrigal wing 40 from moving beyond the top 16 of the minder body that is limiting the markers 34 to rotation of 180° and between detent positions at 90° to each other defined by detent recesses 47. The marks on faces 18 and 20 of the minder body may be applied by stamping, labeling or painting or the like and the numbers of some are in accordance with the characteristics of the film type and number of frames for the cartridges employed in the various cameras. The snap fitting of the markers to the minder body prevents detachment and prevents inadvertant shift in angular position of those markers, particularly through the use of the detent means. The markers may take a different form, they maybe of a simplified nature and constitute an L-shaped member formed of spring material which is frictionally mounted to the minder body 12 with the friction mount means effectively locking the pivotal arm at a desired angular position on the faces 18 and 20 of the minder body. Further while the minder body sides have been flatened by prepheral recesses to form the flat faces 18 and 20, otheer means may be employed and the minder body can take a form other than being disc like or of a relatively short length cylinder. As may be appreciated, the cassette film type and frame minder of the present invention constitutes an attachment which is adaptable to most film cameras which are hand held and use roll film. The device is readily attached to the body of the camera utilizing existing means for mounting of attachments to the camera and permits in turn conventional mounts to be coupled to the camera without interference by the presence of the minder body itself. Preferably, prior to inserting of the film into the camera or immediately thereafter, the photogapher sets the markers 34 to the type film being used and the number of frames being carried by the cassette. Then, regardless of the length of time the film remains in the camera or were the photographer uses more than one camera, there is always an immediate visual indication to photographers of the film type and number of frames for the filming within the camera.

I claim:

1. A cassette film type and frame minder for a still camera, said minder comprising: a minder body, a means for attaching said body to said camera, laterally opposed faces on said body, a marker arm pivotally mounted on each face for sweeping across the face thereof, a set of marks carried by each face at circumferential spaced positions relative to the arc sweep of said marker, one of said sets of marks comprising indicia identifying given numbers of film frames for said camera carried cassette and said other set of marks comprising indicia indicative of the specific type of film within said cassette.

2. The cassette film type and frame minder as claimed in claim 1 wherein said minder body comprises a cylinder, opposed opposite side of said cylinder are flatened to form said laterally opposed faces and said markers each comprise an L-shaped member including a shaft, an integral marker arm extending at right angles to said shaft and said cylindrical body comprises a transverse hole extending at right angles to the axis of the cylinder and through said body from one face to the other and wherein each marker shaft projects within said transverse hole from opposite sides thereof such that said arms rotate about the axis of said shafts and sweep across the faces of said cylinder.

3. The cassette of film type and frame minder as claim 2 wherein said marker arm facing said body face bears a spherical detent and spherical recesses are provided on each face adjacent given marks at respective locations corresponding to the path of movement of said arm born detent and wherein, means are provided for bearing said detent into contact with the faces of said minder body, respectively, such that, said markers are frictionally locked at a given angular position by the detents at a selected mark location.

4. The cassette film type and frame minder as claimed in claims 3 wherein said cylinder bears a threaded plug on one end face, and bears a threaded hole on the opposite end face thereof as such that said minder cylinder cylindrical body may be threaded to the bottom of said camera without interference to mount attachments which in turn may be threaded to the threaded hole on the opposite end face of said cylinder cylindrical body.

5. The cassette film type and frame minder as claimed in claim 4 wherein said transverse hole opens to said axial threaded hole and, each shaft is bifurcated on its end remote from said arm and is provided with radially projecting lips at the end of each bifurcated shaft portion and is of a length such that said bifurcated shaft portion lips are compressed during initial projection through said transverse hole but expand when said flanges enter said threaded axial hole so as to form a snap fit connection of said marker to said minder body and constitute said biasing means for biasing said detent into said spherical recesses during sweep of said marker arm across the face of said minder body.

* * * * *